United States Patent [19]

Caswell

[11] 4,284,212
[45] Aug. 18, 1981

[54] PILOT ACTUATED DIAPHRAGM VALVE

[75] Inventor: Richard L. Caswell, Salisbury, Md.

[73] Assignee: Dresser Industries, Inc., Dallas, Tex.

[21] Appl. No.: 99,433

[22] Filed: Dec. 3, 1979

Related U.S. Application Data

[63] Continuation of Ser. No. 804,964, Jun. 9, 1977, abandoned.

[51] Int. Cl.³ .................... G01F 11/00; F16K 31/02
[52] U.S. Cl. .................... 222/333; 141/59; 141/392; 251/30; 251/45
[58] Field of Search ............... 137/493, 493.1; 141/392, 59; 222/74, 75, 333; 251/28, 30, 34, 36, 38, 45, 46

[56] References Cited

U.S. PATENT DOCUMENTS

| 2,480,712 | 8/1949 | Carbon | 251/34 |
| 3,010,691 | 11/1961 | Canfield | 251/34 |
| 3,159,176 | 12/1964 | Russell et al. | 137/493.1 |
| 3,439,895 | 4/1969 | Marandi | 251/30 |
| 3,495,804 | 2/1970 | Müller et al. | 251/30 |
| 3,538,944 | 11/1970 | Riordan | 251/45 |
| 3,952,781 | 4/1976 | Hiller | 141/59 |
| 3,981,335 | 9/1976 | Deters | 141/59 |

Primary Examiner—Martin P. Schwadron
Assistant Examiner—G. L. Walton
Attorney, Agent, or Firm—Daniel Rubin

[57] ABSTRACT

A diaphragm valve operated by a solenoid pilot for opening and closing the gasoline passage from a pumped inlet to the nozzle of a gasoline dispenser. A valve body forms an internal fluid passage for series installation with that of the dispenser. An annular seat surrounds the body passage at an intermediate location while an upstream facing diaphragm cooperates with the seat to open and close the passage to fluid flow. A spaced apart valve plate in combination with the diaphragm form a liquid tight chamber into which gasoline at the inlet can enter through restrictive one-way orifices. Fluid pressure in the chamber aided by a bias spring urges the diaphragm toward the set in opposition to pump pressure at the inlet.

The pilot valve is spring biased toward a closed relation and is loop connected from the chamber to the outlet. Energizing the pilot effects a reduction in chamber pressure enabling relatively greater inlet forces against the diaphragm to move the diaphragm toward open position. The pilot valve also operates as a backflow restrictor from the dispenser hose and in response to an overpressure opens to permit backflow to the chamber. A relief valve located internally of the chamber operates in conjunction with pilot backflow operation to relieve chamber pressure buildup to the inlet.

6 Claims, 6 Drawing Figures

PILOT ACTUATED DIAPHRAGM VALVE

This is a continuation of application Ser. No. 804,964, filed June 9, 1977, now abandoned.

BACKGROUND OF THE INVENTION

1. The field of art to which the invention pertains includes the art of fluid handling and line condition change responsive valves therefor.

2. Customary practice in many fluid handling and dispensing systems includes installation of an automatic shutoff valve of sorts for preventing inadvertent flow other than when expressly intended or authorized. Such valves are particularly useful, if not required by many local codes, where dispensing combustible commodities such as gasoline. A pilot actuated shutoff valve commonly used at gasoline service stations between the pump and hose of each dispenser is disclosed in U.S. Pat. No. 3,538,944.

At a typical gasoline service station, more than one dispenser is provided for delivering each available grade of gasoline with each such dispenser being frequently connected in parallel with others receiving their gasoline in a common distribution system from an underground storage tank. Actuating any one or more of the dispensers energizes the pump which in turn pressurizes the entire distribution system thereby increasing the inlet pressure at all of the dispensers whether actuated or not.

It is essential under those conditions that the installed shutoff valve be effective to prevent flow, even in leakage quantities, through those of the dispensers which are not activated. At the same time, the inactive dispensers continue to contain gasoline at the system shutdown pressure which is subject to increase by exposed temperature increases or the like. This has necessitated use of a separate check and pressure relief valve in order to prevent breakdown of the equipment.

Despite the problems and expense associated with the separate valves in the manner of the prior art, it has not heretofore been known how to combine the functions of on-off, check and relief embodied in a single valve construction.

SUMMARY OF THE INVENTION

The invention relates to a pilot actuated diaphragm valve and more specifically to such a valve able to combine the functions of on-off, check and relief embodied in a single valve construction. Consequently, the valve of the invention is able not only to afford positive shutoff against unintentional discharge from unauthorized dispensers but at the same time is both able to restrict backflow and relieve excess hose pressure as might be caused by exposure to increased temperatures. This is achieved in accordance with the diaphragm valve of the invention in which a spring biased flexible diaphragm serves to open and close a valve flow passage to fluid flow. The front side of the diaphragm is exposed to fluid pressure at the inlet while the backside is exposed to fluid pressure in a liquid chamber partially formed by the diaphragm. The chamber is maintained in communication with the inlet via a pair of flow restrictive orifices checked against backflow by means of a resilient skirting cover. A spring biased solenoid pilot is loop connected between the chamber and body outlet such that when energized causes a drain of chamber fluid resulting in a pressure reduction therein. That unbalances the forces acting against the diaphragm with the relatively greater forces operating to move the diaphragm toward the open position. Deenergizing of the pilot solenoid enables rapid equalization of forces to be reestablished whereby the diaphragm is restored to its closed position. In response to an excess hose pressure the pilot permits backflow and in combination with a relief valve in the liquid chamber affords fluid relief backflowing from the chamber to the connected upstream delivery piping.

By operating in the foregoing manner, surge pressures encountered in the system by which inadvertent dispensing could otherwise occur through unauthorized dispensers is thereby contained while enabling such valves to be all encompassing in the functions they can perform.

It is therefore an object of the invention to provide a novel pilot actuated diaphragm valve.

It is a further object of the invention to provide a novel pilot actuated diaphragm valve able to maintain closure in response to surge pressures encountered in the system in which it is installed.

It is a further object of the invention to effect the last recited object with a novel pilot operated valve affording the added functions of check and relief in a single valve construction.

Figure 1:
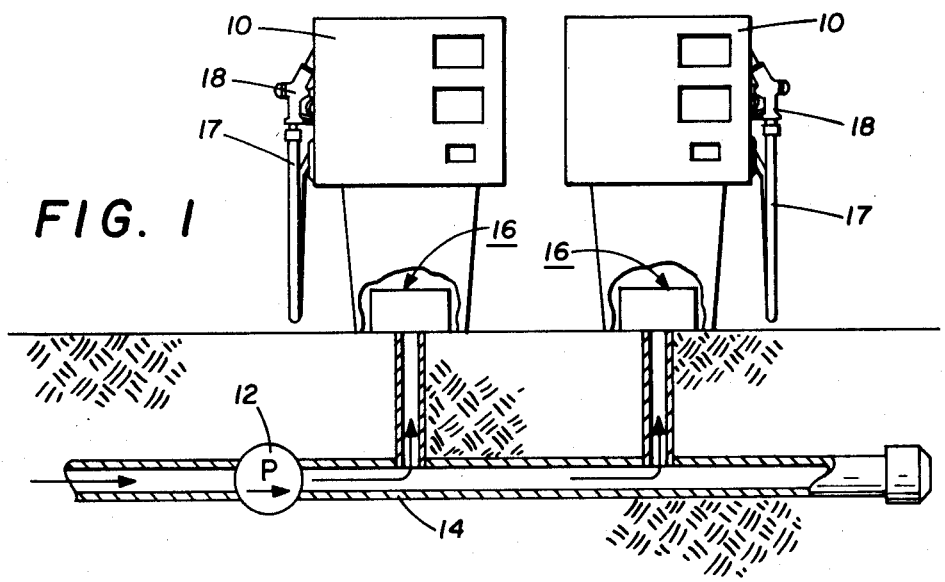
FIG. 1 is a schematic illustration of dispensing equipment at a gasoline service station.

Referring first to FIG. 1, there is shown a plurality of gasoline dispensers 10 each being supplied by a pump 12 from an underground storage source (not shown) through delivery piping 14 to a valve 16 in accordance herewith. Actuating any one of dispensers 10 enables valve 16 to pass the supplied gasoline through hose 17 to dispenser nozzle 18 in the manner to be described.

Figure 2:
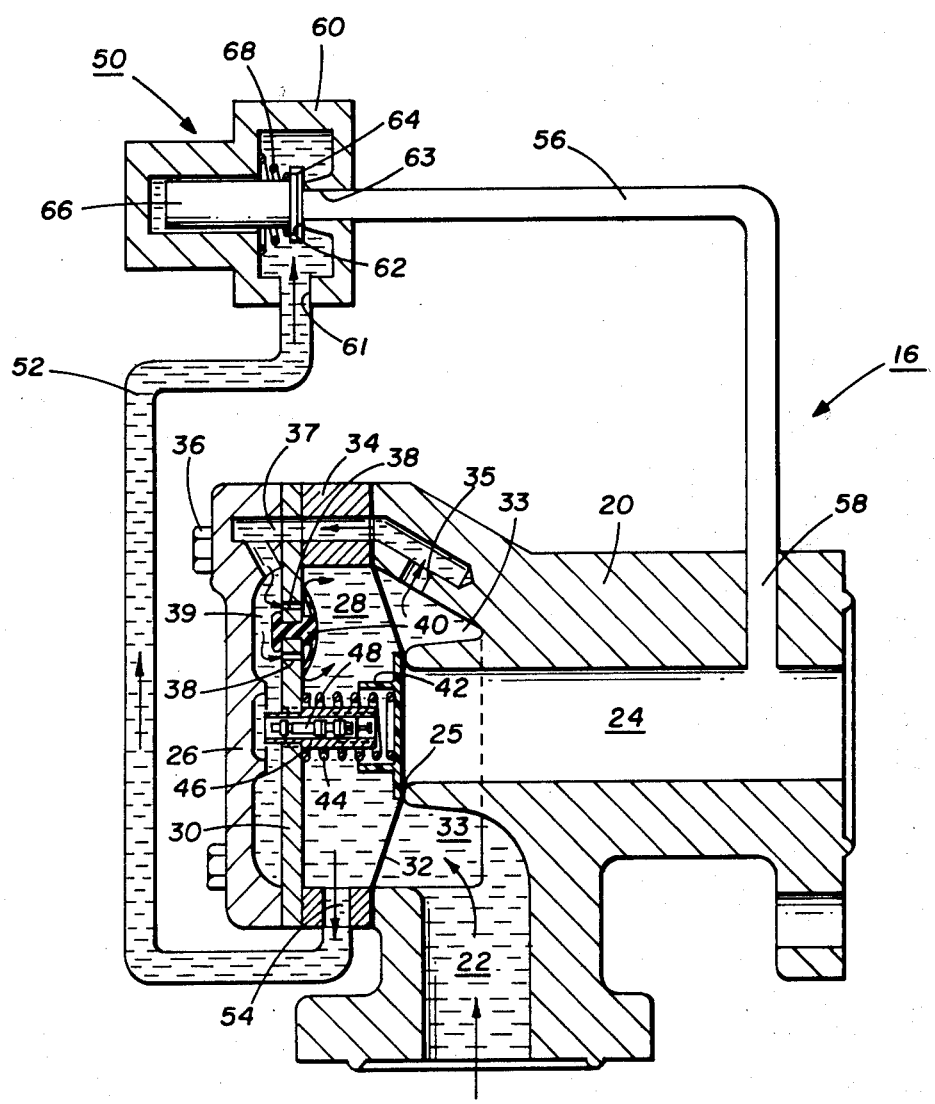
FIG. 2 is a sectional elevation of a valve in accordance with the invention in its start up relation.

As best seen in FIG. 2, valve 16 comprises a valve body 20 defining a flow passage between an inlet 22 and an outlet 24 for gasoline received from supply piping 14. An annular seat 25 surrounds the passage at an intermediate location therein. By means of a cap 26 assembled via bolts 36 and peripheral inserts 34 to the leftmost side of body 20, there is formed an enclosed fluid holding chamber 28 contained between a valve plate 30 and a flexible diaphragm 32. The diaphragm is adapted to cooperate with seat 25 for opening and closing communication between passages 22 and 24 as will be explained.

Valve plate 30 is positioned generally parallel to the secured relation of diaphragm 32 inward of cap 26 to define a flow passage 39 therebetween. Flow to passage 39 is received from inlet 22 via intermediate passages 33, 35 and 37. Formed in plate 30 are two small diameter thruflow apertures 38 of about 1/16 inch diameter transversely extending between passage 39 and the interior cavity of chamber 28. Secured on plate 30 between the apertures 38 in superposed overlying relation therewith is a button-like umbrella valve 40 of resilient elastomeric composition. As will be understood the skirt of valve 40 lifts at a nominal pressure on the order of one-half inch water gauge for allowing liquid flow from passage 39 into chamber 28 but precludes reverse flow therefrom.

Contained within chamber 28 coaxially with and of approximately like diameter as seat 25 is a cup-like button disc 42 biased toward the seat by a compressed spring 44 coiled about a sleeve 46. Disc 42 in this relation acts to urge diaphragm 32 into seating relation against seat 25 for closing the valve against flow from inlet 22 to outlet 24. Tubular sleeve 46 is threadedly supported in valve plate 30 and internally contains a commercially available tire type air valve to provide relief from overpressure as will be explained.

Cooperating with the main valve for effecting its operation is a pilot operator in the form of electric solenoid valve 50 of a type commercially available and capable of being energized via leads 51. For the embodiment being described the pilot valve comprised a General Controls Catalog No. 5311XFO2V2AD7201. Valve 50 includes a housing 60 connected in a bypass arrangement with respect to the main valve by means of an inlet 61 communicating via tubing 52 from an aperture 54 extending inward of chamber 28 and outlet 63 communicating via tubing 56 and aperture 58 with outlet passage 24. No annular seat 62 is defined surrounding outlet 63 against which a closure disc 64 carried on the end of a plunger 66 is urged by a compressed coil spring 68 for maintaining the valve closed against flow.

In operation, the startup relation is illustrated by FIG. 2 in which liquid entering inlet 22 from piping 14 is exposed directly against diaphragm 32 in front chamber 33. From chamber 33 the liquid is free to flow through aperture 35, passage 37 and rear passage 39 from which it enters via apertures 38 into chamber 28. When chamber 28 is filled, the relatively greater backside area of diaphragm 32 liquid exposed from chamber 28 exceeds the front side liquid exposure from chamber 33. This fluid force coupled with the force exerted by spring 44 thru button 42, forces the diaphragm into seating relation against seat 25 for closing off flow from inlet 22 to outlet 24. Chamber 28 maintains the diaphragm firmly against seat 25 regardless of pressure changes incurred at inlet 22.

Figure 3:
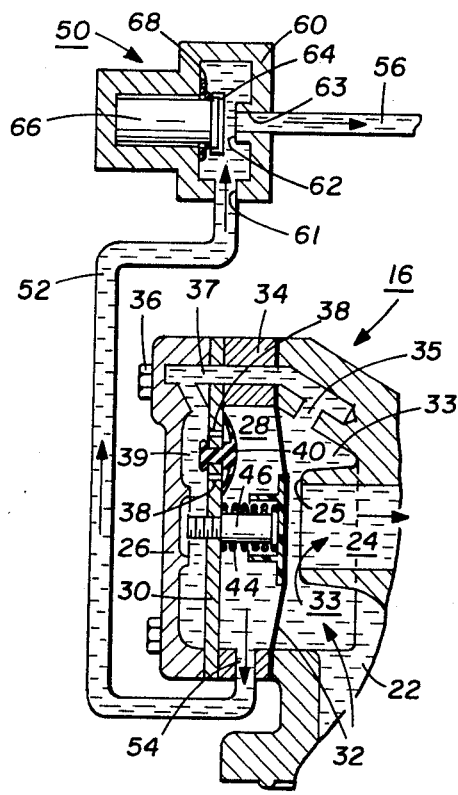
FIG. 3 is a fragmentary illustration of the valve hereof in its full flow relation.

When either or both dispensers 10 are actuated, solenoid valve 50 of the affected dispenser is energized withdrawing plunger 66 as shown in FIG. 3 and placing inlet 61 in open communication with outlet 63. With the valve open, flow from the inner chamber 28 is allowed to essentially drain through tubing 52 and out tubing 56 to outlet 24 which normally is at a lower pressure than liquid at inlet 22.

As the resistance to flow through solenoid valve 50 is considerably less than the resistance through restrictive apertures 38, the discharge from chamber 28 causes a pressure drop therein to a value sufficiently below the fluid pressure in chamber 33. When sufficient unbalance of forces occurs, diaphragm 32 is moved leftward away from seat 25 affording a direct flow path communicating from inlet 22 through outlet passage 24. Once opened, the increased central surface area of diaphragm 32 exposed to the inlet pressure increases the force tending to maintain the diaphragm in its open relation.

Figure 4:
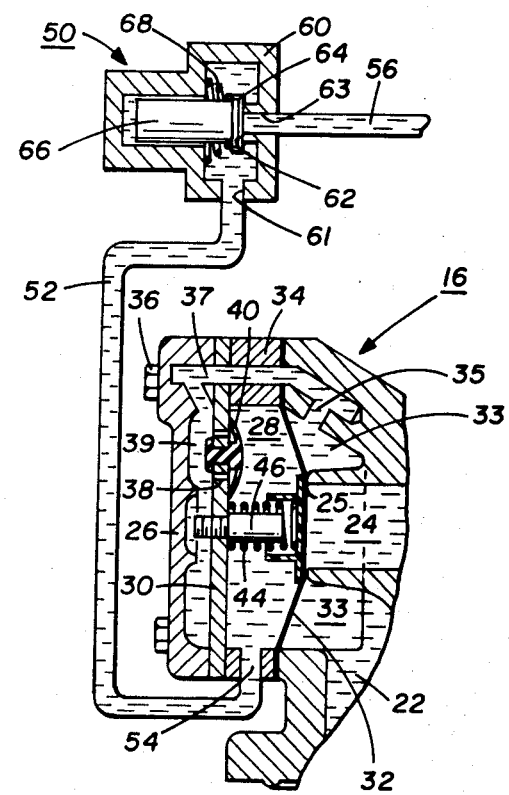
FIG. 4 is a fragmentary illustration of the valve hereof in its post flow relation.

On deenergizing solenoid 50, as illustrated in FIG. 4, the liquid pressure on both sides of diaphragm 32 quickly equalizes enabling the greater closing force exerted by spring 44 to restore diaphragm 32 to its closed position against seat 25. When closing occurs, outlet 24 and the connecting hose 17 will contain the fluid therein at about the same pressure which existed on closure of valve 16.

Figure 5:
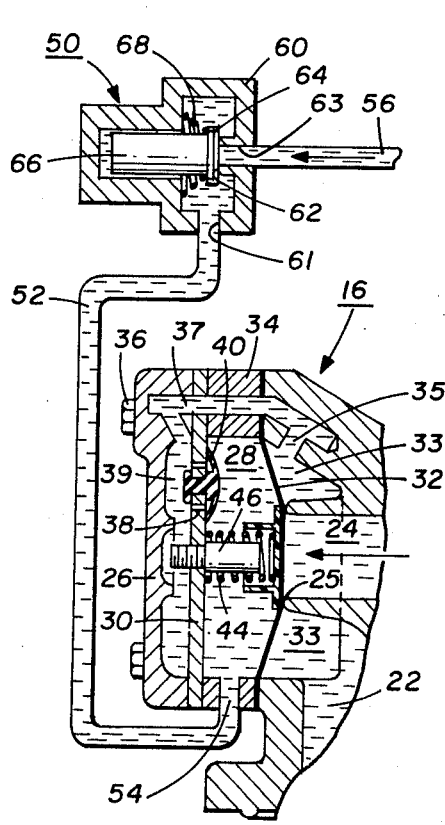
FIG. 5 is a fragmentary illustration of the valve hereof in its post flow check valve relation; and FIG. is an illustration of the valve hereof in its back pressure relief relation.

With the dispenser inactivated or "off" valve 16 functions as a check valve holding pressure within the hose as shown in FIG. 5. Backflow from chamber 28 through apertures 38 is prevented by umbrella valve 40 thereby maintaining diaphragm 32 against seat 25 in opposition to any backflow pressure exerted from hose 17 as might be imposed by slight temperature changes or the like. At the same time valve 50 is able to hold against backpressures on the order of 10 psig.

Figure 6:
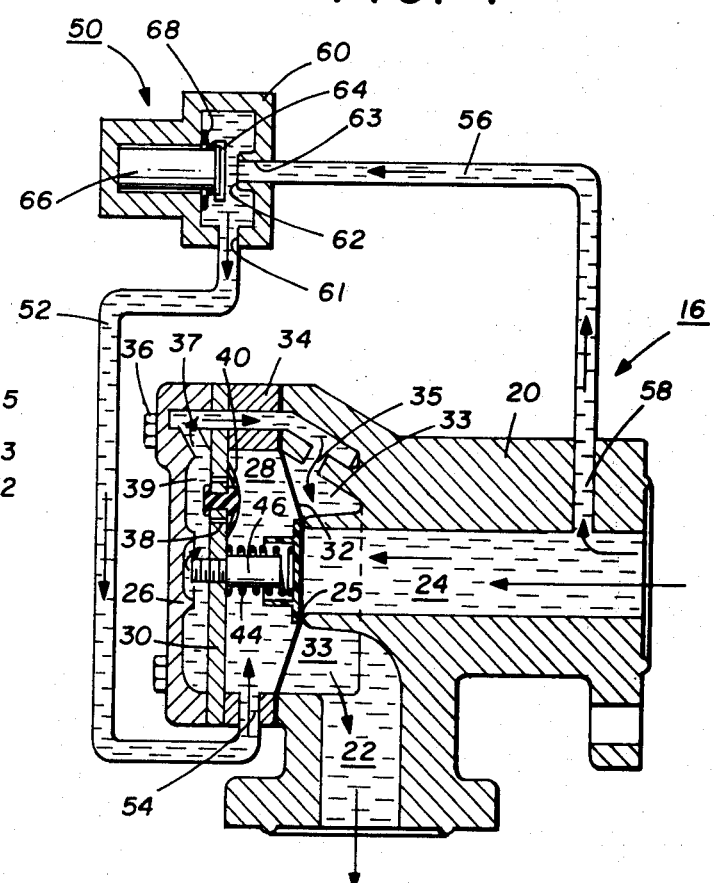

Should hose backpressure increase to on the order of 35 psig, valve 16 will function to relieve overpressure via relief valve 48 in the manner illustrated in FIG. 6. With the backpressure in outlet 24 being exerted both against diaphragm 32 and disc 64 of solenoid 50, solenoid plunger disc 64 is forced away from seat 62 to permit reverse flow through tubing 52 to inward of chamber 28. For accommodating the received backflow, relief from chamber 28 is afforded by valve 48 discharging from chamber 28 through chamber 39 back through passage 37 and aperture 35 to outward of inlet 22 as illustrated by the arrows. To be operable for effecting relief, the magnitude of backpressure must exceed the combined pressures at inlet 22 and that necessary to operate valve 48. Generally speaking, valve 48 will open at a differential of about 8 to 18 psig.

By the above description there has been disclosed a novel pilot operated diaphragm valve affording positive on-off operation particularly suitable for gasoline service station applications to provide positive shutoff against leakage discharge through unauthorized dispensers. When a dispenser 10 is switched "off" or when a remote "shutdown" is made as in the case of a console controlled prepaid transaction, pilot valve 50 is deenergized to provide a shutoff condition. This allows pressure to equalize on both sides of diaphragm 32 for maintaining the main valve shut against flow from inlet 22 through outlet 24. With a dispenser 10 turned off, closing of the pilot valve 50 and main valve effectively hold hose 17 full at the shutdown pressure. While operating for open and shut service is its principal function, the valve hereof is at the same time able to afford relief of excess hose pressure caused by temperature increases by fluid forced back through pilot valve 50 from which it backflows to chamber 28 for relief via valve 48 back to inlet 22. As a result of the one way feature afforded by umbrella check valve 40, system surges as might occur preclude the possibility of passing liquid through the valve and dilating a low pressure hose to even cause computer registration.

Since many changes could be made in the above construction and many apparently widely different embodiments of this invention could be made without departing from the scope thereof, it is intended that all matter contained in the drawings and specifications shall be interpreted as illustrative and not in a limiting sense.

The embodiments of the invention in which an exclusive property or privilege is claimed are defined as follows:

1. In a gasoline dispensing system including a plurality of gasoline dispensers, a storage source of gasoline, pump means operable to supply a pressurized supply of gasoline from said storage source concomitantly to all of said plurality of gasoline dispensers when at least one of said dispensers is actuated, each of said dispensers including a nozzle through which to deliver gasoline supplied from said storage source, means to actuate the dispenser for enabling said nozzle delivery and a diaphragm valve operably positioned in series flow relation with the dispenser inlet supplied by said pump means for preventing flow from the pressurized supply to the dispenser when the dispenser is not actuated and to enable flow to the dispenser when the dispenser is actuated, the improvement in which said diaphragm valve comprises in combination:

(a) a body forming an internal fluid passage between an inlet and an outlet for gasoline supplied from the storage source and including a seat defined surrounding said passage at an intermediate location therein;

(b) an imperforate flexible diaphragm supported proximate to said passage with one face exposed to fluid pressure at said inlet and adapted to cooperate with said seat to open and close said passage to fluid flow;

(c) a defined fluid chamber in communication with said inlet providing fluid pressure exposure to the opposite face of said diaphragm;

(d) restrictor means in the fluid flow path between said inlet and said chamber for restricting the fluid flow rate into said chamber; and (e) pilot valve means operable by said dispenser actuating means between open and closed positions for conducting fluid flow when open from said chamber to the outlet of said body for enabling relatively greater fluid forces at said inlet to move said diaphragm toward its open position with respect to said seat.

2. In a gasoline dispensing system according to claim 1 in which said diaphragm valve includes check valve means in the fluid flow path from said valve inlet to said chamber preventing backflow from said chamber into said flow path.

3. In a gasoline dispensing system according to claim 2 in which said diaphragm at least partially forms one wall of said chamber, there is included a valve plate spaced from said diaphragm at least partially forming a second wall of said chamber and said restrictor means comprises a plurality of restrictive flow orifices extending through said valve plate to inward of said chamber.

4. In a gasoline dispensing system according to claim 3 in which said check valve means comprises an elastomeric umbrella unit contiguously skirting said orifices on the chamber side of said valve plate for preventing reverse flow from said chamber through said orifices.

5. In a gasoline dispenser including an inlet communicating with a storage source supply, a nozzle through which to deliver gasoline supplied from said storage source and means to actuate said dispenser for enabling said nozzle delivery, a diaphragm valve operably positioned in series with the inlet of said dispenser and comprising in combination:

(a) a body forming an internal fluid passage between an inlet and an outlet for gasoline supplied from the storage source and including a seat defined surrounding said passage at an intermediate location therein;

(b) an imperforate flexible diaphragm supported proximate to said passage with one face exposed to fluid pressure at said inlet and adapted to cooperate with said seat to open and close said passage to fluid flow;

(c) a defined fluid chamber in communication with said inlet providing fluid pressure exposure to the opposite face of said diaphragm, one wall of said chamber being at least partially formed by said diaphragm;

(d) a valve plate spaced from said diaphragm at least partially forming a second wall of said chamber;

(e) restrictor means in the fluid flow path between said inlet and said chamber for restricting the fluid flow rate into said chamber, said restrictor means comprising a plurality of restrictive flow orifices extending through said valve plate to inward of said chamber;

(f) check valve means in the fluid flow path from said valve inlet to said chamber preventing backflow from said chamber into said flow path and comprising an elastomeric umbrella unit contiguously skirting said orifices on the chamber side of said valve plate for preventing reverse flow from said chamber through said orifices;

(g) relief valve means extending between said chamber and said flow path for discharging fluid from said chamber to backflow through said flow path in response to a predetermined fluid overpressure in said body outlet; and (h) pilot valve means operable by said dispenser actuating means between open and closed positions for conducting fluid flow when open from said chamber to the outlet of said body for enabling relatively greater fluid forces at said inlet to move said diaphragm toward its open position with respect to said seat.

6. In a gasoline dispenser according to claim 5 in which said pilot valve means is self-responsive to a predetermined overpressure in said body outlet to provide open backflow from said outlet to inward of said chamber for fluid relief actuating by said relief valve means.

* * * * *